United States Patent [19]

Poret

[11] 4,230,270

[45] Oct. 28, 1980

[54] MULTINOZZLE BLOCK FOR SPRAYING TOOL SURFACES

[75] Inventor: Henri Poret, Cleon, France

[73] Assignee: Regie Nationale des Usines Renault, Boulogne-Billancourt, France

[21] Appl. No.: 959,019

[22] Filed: Nov. 9, 1978

Related U.S. Application Data

[63] Continuation-in-part of Ser. No. 749,098, Dec. 9, 1976, abandoned.

[30] Foreign Application Priority Data

Dec. 9, 1975 [FR] France ............................... 75 37545

[51] Int. Cl.[3] ........................ B22D 17/20; F16N 11/00

[52] U.S. Cl. ...................................... 239/67; 118/317; 164/73; 239/112; 239/407; 239/412; 239/562; 425/107

[58] Field of Search .................... 239/69, 70, 112, 407, 239/412, 433, 434, 548, 556, 560, 562, 67; 118/306, 317; 164/72, 73, 267; 264/169, 213; 425/107, 225-232; 137/596.14

[56] References Cited

U.S. PATENT DOCUMENTS

| | | | |
|---|---|---|---|
| 2,598,961 | 6/1952 | Andrus | 239/562 X |
| 3,322,148 | 5/1967 | Rochte | 137/596.14 |
| 3,341,124 | 5/1975 | Barnes | 239/112 X |

FOREIGN PATENT DOCUMENTS

| | | | |
|---|---|---|---|
| 975618 | 2/1962 | Fed. Rep. of Germany | 239/112 |
| 1227201 | 10/1966 | Fed. Rep. of Germany | 164/72 |
| 2064238 | 8/1971 | Fed. Rep. of Germany | 239/112 |
| 2321102 | 4/1973 | Fed. Rep. of Germany | 239/70 |
| 2548463 | 5/1976 | Fed. Rep. of Germany | 239/112 |
| 2044311 | 2/1971 | France | 239/184 |
| 2189655 | 1/1974 | France | 239/412 |
| 2247060 | 5/1975 | France | 239/412 |

*Primary Examiner*—Andres Kashnikow
*Attorney, Agent, or Firm*—Oblon, Fisher, Spivak, McClelland & Maier

[57] ABSTRACT

Automatic and reproducible spraying of liquid materials on complex tool surfaces is attained through a multinozzle spraying block, traversed by supply passages for the spray material and the air for spraying, and comprising, on at least one of its faces, a series of valves provided with elastic obturating membranes and with pneumatic logic control, programming and communication of the spray material supply passages with the spray air outlets of the nozzles grouped on at least one of the block faces. Application of the multinozzle spraying block to automatic treatment is achieved by spraying materials on tool surfaces under constant conditions on repetitive-cycle machines.

4 Claims, 3 Drawing Figures

MULTINOZZLE BLOCK FOR SPRAYING TOOL SURFACES

This is a continuation-in-part Application of Ser. No. 749,098 filed Dec. 9, 1976, now abandoned.

BACKGROUND OF THE INVENTION

The present invention relates to an automatic arrangement for treating shaping tools on repetitive-cycle machines and, more particularly, to a multinozzle block for spraying all sorts of liquid materials, as coolants, temporary protective and lubricative coatings, under constant reproducible conditions, regardless of the nature of these materials, on the surface of the tools for shaping various materials by molding or plastic deformation. Such multinozzle blocks are particularly suitable for spraying liquids containing suspended solids, without the risk of becoming fouled or stopped up, thanks to a builtin rinsing system.

The coating materials may be thermal insulators, providing protection to the tools, as in the case of molds for die casting metals, thermal insulators with lubricating action, in the case of hot-forging stamps or lubricants, and mold-stripping agents in the case of injection or molding presses for materials such as plastics.

These coating operations, which must be executed repetitively as a function of the machine cycles, generally by spraying and vaporization of such materials in the form of an air-liquid emulsion on the tool surfaces, are performed either manually by the machine operator or automatically by an arrangement composed of a multiplicity of nozzles mounted, with an orientation predetermined as a function of the tool to be coated, on a rigid holder fastened to a manipulating device for moving it into place and retracting it from the position for spraying the tool surface, in synchronism with the machine's operating cycle. A constant volume of the coating material must be sprayed in each cycle, in very diverse positions and orientations, but always identical, and depending on the surface relief of the tool, often being rather inaccessible. French Application No. 69/15,841 which has become French Patent No. 2,044,311 describes such an arrangement.

However, the automation of such operations has always presented great difficulties, not only because of the complexity of the tool surfaces, but also on account of the very nature of the coating material, principally in the die casting of metals. These coating materials, quite often consisting of graphite compounds, foul the nozzles and thus cause stoppage of the internal passages, leading to a variation in output at the nozzles and to a lack of regularity in the volume sprayed on the surface of the tools. Moreover, the coating material within the nozzles becomes turbulent in its flow, accelerating the fouling and consequently the blockage. In addition, the nozzles, rather inaccessible because of their number in a restricted volume, are subject to delicate adjustments, both frequent and difficult, but nevertheless necessary to assure spraying of the coating material in diverse but precise directions.

Indeed, each nozzle is independently mounted and has its own supply passages for compressed air and liquid for spraying, these three parameters multiply the chances for malfunctioning which entail unsatisfactory coating of the tools and consequent degradation of the state of their surface, thus decreasing their efficiency. In most cases, supplementary manual intervention alleviates these difficulties in spite of the inherent imperfections in the human factor.

SUMMARY OF THE INVENTION

The present invention, which offers a solution to these problems, relates to a multinozzle block with several spray passages, the directions of which are predetermined in accordance with the surface of the tool to be coated. The coating material is conveyed through these cylindrical passages, which undergo no diminution in section, during controllable and constant periods of time. These periods of time are set by electrical switches of a familiar type which assure the precision necessary for this operation. The fluids, air and liquids to be sprayed, are supplied at controllable and independent pressures.

The passages are opened and closed by means of pneumatically controlled valves of self-evident type, but the membranes of which act on large-area orifices. In addition, the block has a rinsing circuit which can be activated as often as desired in the operating cycle of the machine. It is also furnished with removable, nozzle-holding manifolds or covers, the rapid interchangibility of which permits adapting it to the tool to be coated.

The block is attached to a movable assembly for putting it in place and retracting it from the position for spraying the surface of the tool. The movements of this assembly, as well as the different phases of opening and closing of the circuits of the block, are inserted in the cycle of the machine by means of the well-known techniques of electric or pneumatic logic control. The positioning and retraction are effected with a linearly or circularly displaced arm, operated electrically, mechanically, pneumatically or hydraulically. The latter serves also as the support for the fluid supply lines to the block. Such arms are described in the French Patent No. 2,044,311, already mentioned.

By its design, the multinozzle block of the present invention reduces the chances of malfunction present in the systems with separate nozzles and is lower in cost. For instance, a block with 10 spray nozzles is 50% cheaper than 10 independent nozzles. Not having flow regulators in the liquid passages, which would induce turbulence, and consequently cause fouling of the passages, it ensures constant flow with time. The only controls are those on pressure and timing, thus assuring laminar flow of the spray liquid. The rinsing circuit incorporated in the block is actuated during machine cycling and before stopping the machine. In this way, any deposits of spray material are "washed away" and no blockage can develop by drying or evaporation during prolonged system stops. Moreover, the use of interchangeable manifolds suited to each tool configuration provides great flexibility in adapting to different types of tools, the surfaces of which are to be treated.

More generally, the multinozzle block of the invention for spraying tool surfaces is characterized by the fact that it contains passages for supplying the spray materials and the air for spraying and has, on at least one of its faces, a group of valves, with elastic membrane obturation, and pneumatic logic control for programmed communication of the spray-material supply passages with the spray-air outlets as the nozzles grouped on at least one face of the block. The spray-material supply passages can be supplied with different fluids.

The various spray-liquid passages are purged and washed by a built-in rinsing system comprising a rinsing-liquid supply passage connected under programmed control by at least one elastic membrane valve with pneumatic logic control to the spray-liquid passages.

The adaptation of a single block to different shaping tools is accomplished by rapid interchange of the nozzle manifolds, which are covers interchangeable on a single surface of the block, provided with preadjusted nozzles and plugs mounted in an arrangement suited to each tool for blocking, through the cover, the outlet orifices of the unused nozzles.

The passages in the block are straight and constant in cross-section to ensure laminar flow of the liquids, the output of which, at constant flow, is regulated by the opening time of the pneumatic valves with programmed opening times.

This arrangement can be used in all processes employing tools, such as those for die casting, plastic injection molding, forging and stamping. It assures an increase in production, thus permitting rapid, amortization of the relatively low investment therein.

BRIEF DESCRIPTION OF THE DRAWINGS

The details of the invention will become more apparent from the following detailed description, when considered in connection with the accompaning drawings. It relates to tools for die casting parts from light alloys for the automobile industry. In the drawings.

DETAILED DESCRIPTION OF THE PREFERRED EMBODIMENT

Figure 1:
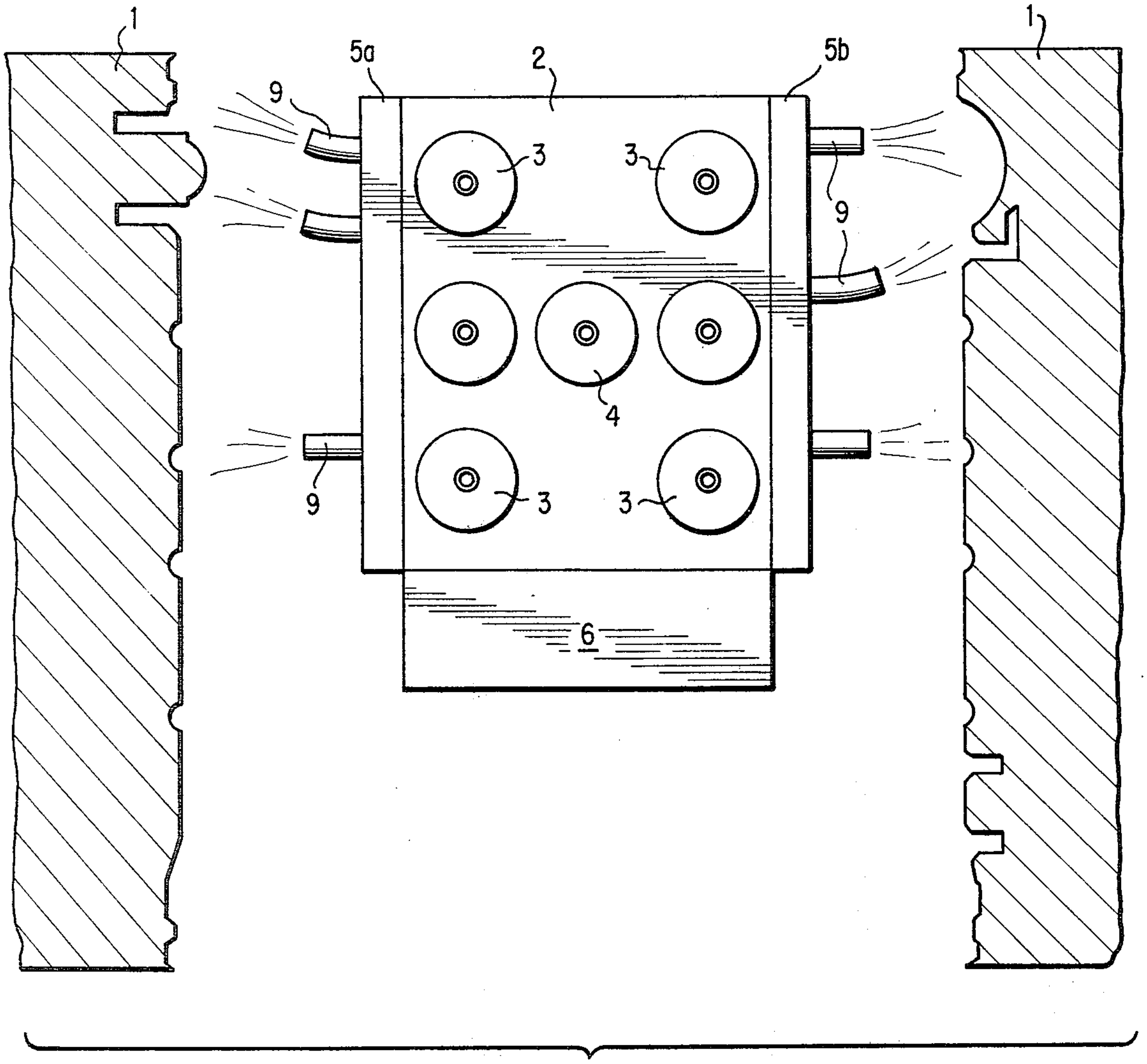
FIG. 1 shows the assembly mounted in working position inside an open mold for a die-cast part.

Referring now to the drawings, the multinozzle block is shown in FIG. 1 being surrounded by the surfaces of an open mold 1, the body of the block 2 receiving on its front surface the covers of control valves 3 and 4, on each of its sides, a manifold or cover 5*a* and a manifold 5*b*, provided with nozzles 9 oriented and adapted to the needs for spraying the mold surfaces 1. The whole is fastened on a central plate or fluid-supply block 6, the fluids arriving by way of flexible lines, not shown. The assembly is attached to a manipulating arm, not shown.

Figure 2:
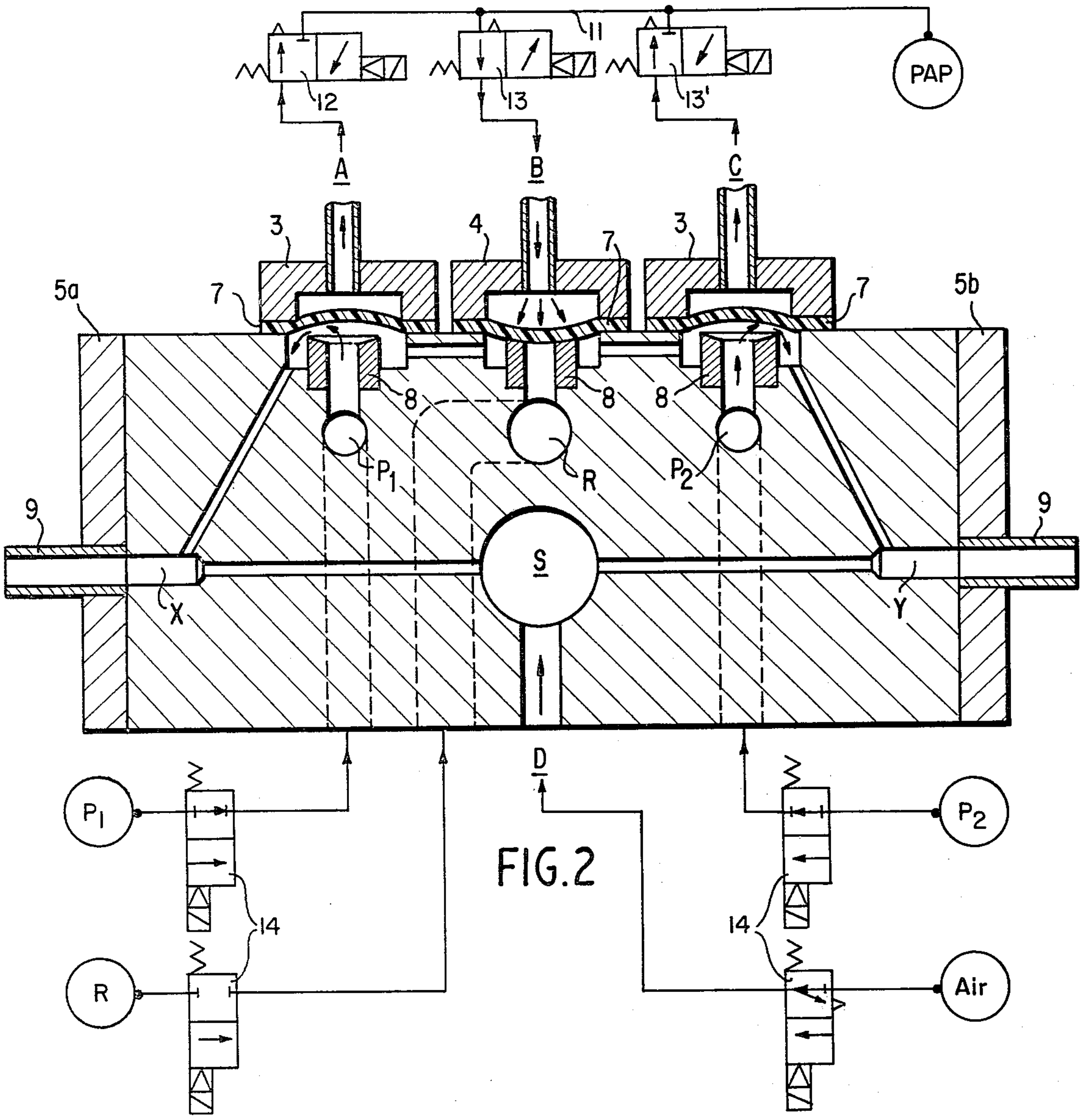
FIG. 2 shows the same assembly in cross-section, revealing the different passages in the block and the corresponding control circuitry.

In FIG. 2 where the multinozzle block is shown in cross-section, the control valve covers 3 and 4 hold obturating membranes 7 in place with the help of screws, also not shown. These membranes may be made of synthetic rubber, e.g., of the type known commercially as "vulkollan", which act on the valve seats 8 set in block 2. The spray materials enter by way of passages P1 and P2, while the rinsing fluid and the spraying air arrive through passages R and S, respectively, both acting to lift the membranes 7 from the seats 8, and the compressed control air is brought in at A, B and C on the opposing sides of the membranes 7.

The circuitry of FIG. 2 shows a duct 11 feeding piloting air pressure (PAP) to pilot valves 3 and 4 through control valves 12 and 13, 13' being shown with pilot valve 4 being activated and control valve 12 being closed so as to let control valve 3 be in an unactivated state and be communicated to outside air pressure via control valve 12. The sequential command of control valves 12 and 13, 13' can be controlled by any pneumatic or electric logic system or even by hand, through a pushbutton box, following a chosen sequential program adapted to the particular job to be accomplished.

Similarly, the feeding ducts of specific slurries P1, P2 of rinsing agent reservoir R and emulsion air pressure (Air) are controlled by sequentially commanded valves 14, here being shown in an opened state for P1, P2 and Air, during spraying operation, with one of the commanded valves 14 communicating with rinsing agent reservoir R for rinsing being closed.

The passages X and Y connect the nozzles 9 with the spray-material supply passages P1 and P2 by way of the membrane valves 7.

Figure 3:
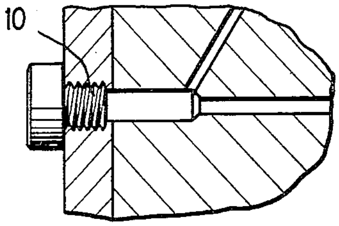
FIG. 3 shows a plug for blocking unused spray orifices and keeping liquid out, to prevent fouling.

FIG. 3 shows one of the passages X or Y, with a plug 10 disposed therein, when the passage is not being used. The manifolds or covers 5*a* and 5*b* are furnished with preadjusted orientable nozzles 9 and plugs 10 closing the unused nozzle outlets on the different manifolds, the numbers varying according to the needs for spraying each mold. In the example described, the nozzles 9 would advantageously be made of copper tubing, crimped or brazed to the manifold and oriented by simple bending, by means of a suitable tool, to avoid damaging the profile.

In operation, the multinozzle block is held between the two separated mold surfaces, as shown in FIG. 1. When the block is in this working position, the spray materials at P1 and P2 are admitted by the control valve A and C (FIG. 2) to the passages X and Y, where they are atomized by teh compressed air entering at D and expelled through the orientable nozzles 9. Once the valves 3 are closed by seating of their membranes, as shown at B, the block is purged with compressed air admitted at D at a pressure higher than that used previously, is then rinsed by the mixture of the air and a liquid R furnished through the valve B, which is now in the open position, as shown at A and C. The technique of controlling the valves A, B and C by pneumatic logic is well known, as for example in the French Application No. 72/22,242 which has become French Patent N. 2,189,655.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multinozzle block for spraying the surfaces of tools, said block being traversed by first and second passages for supplying spray materials and spraying air, respectively,
   - a group of valves disposed on at least one of the faces of said block;
   - elastic obturating membranes being disposed in each of said valves,
   - outlets for spraying air and materials in said block connected to said first and second passages
   - pneumatic logic control means for putting said first and second passages in programmed fluidic communication with said outlets for spraying air and materials through operation of said obturating membranes of said valves,
   - nozzles grouped on at least one of the other faces of said block and communicating with respective outlets for spraying air and materials, and means for purging and washing said first and second passages comprising a built-in rinsing system having a rinsing liquid supply passage separate from said first and second passages in programmed fluidic communication with said passages by at least one of said valves with an elastic obturating membrane and communicating via at least one other valve of said valves with an elastic obturating membrane, under pneumatic logic control, with said passages.

2. A block as set forth in claim 1, which further comprises means for supplying different fluid materials with said passages.

3. A block as set forth in claim 1, wherein said passages are straight and constant in cross-section in order to establish laminar flow, and the output, at constant flow, is regulated by the time of opening the valves with programmed opening times determined by said pneumatic logic control means.

4. A block as set forth in claim 1, wherein said nozzles are formed in nozzle manifolds, which are interchangeable on said at least one other surface of the block and include preadjusted nozzles and plugs therefor, mounted in an arrangement suited to respective different shaping tools, blocking therethrough outlet orifices of unused nozzles.

* * * * *